US007137360B1

(12) United States Patent
Zorzit

(10) Patent No.: US 7,137,360 B1
(45) Date of Patent: Nov. 21, 2006

(54) TUBE ASSEMBLY FOR A BOILER

(75) Inventor: Vittorio Zorzit, Woodbridge (CA)

(73) Assignee: Prime Boilers Inc., Woodbridge (CA)

( * ) Notice: Subject to any disclaimer, the term of this patent is extended or adjusted under 35 U.S.C. 154(b) by 0 days.

(21) Appl. No.: 11/139,535

(22) Filed: May 31, 2005

(51) Int. Cl.
*F22B 15/00* (2006.01)

(52) U.S. Cl. .............................. 122/235.11; 122/235.23

(58) Field of Classification Search ........... 122/235.11, 122/235.12, 235.14, 235.15, 235.23, 235.31, 122/239, 347
See application file for complete search history.

(56) References Cited

U.S. PATENT DOCUMENTS 4,355,602 A * 10/1982 Cooke ................... 122/235.11
4,612,879 A * 9/1986 Cooke ...................... 122/135.1
4,993,368 A * 2/1991 Jones et al. ............. 122/235.23
5,050,542 A * 9/1991 Cooke .................... 122/235.23
6,817,319 B1 * 11/2004 Manay ................... 122/235.23

* cited by examiner

*Primary Examiner*—Gregory Wilson
(74) *Attorney, Agent, or Firm*—Bereskin & Parr

(57) ABSTRACT

A boiler is described comprising a housing with a flue gas inlet for receiving a hot gas flame and an outlet for venting a hot gas produced by the hot gas flame, and a tube assembly mounted within the housing. The tube assembly comprises a lower manifold for receiving a liquid, an upper manifold for receiving a heated version of the liquid; and, a plurality of tubes disposed between the lower and upper manifolds. Each tube is shaped to provide a hot gas pathway that travels in a parallel fashion along at least a lower portion of the longitudinal extent of each tube in the tube assembly to the outlet, whereby the liquid introduced into the lower manifold travels in the plurality of tubes and receives heat from the hot gas along the extent of the hot gas pathway.

20 Claims, 11 Drawing Sheets

TUBE ASSEMBLY FOR A BOILER

FIELD OF THE INVENTION

The invention relates to a design for improving heat transfer and system efficiency for a boiler.

BACKGROUND OF THE INVENTION

A boiler is a pressurized system in which heat is transferred to a fluid. Water is typically used as the fluid for economical reasons and its suitable thermodynamic characteristics. The water is heated by heat transferred to the water from a source of higher temperature (i.e. a flue gas), which is usually produced by the combustion of fuels. The water may be heated to a suitable temperature or heated such that it is vaporized to a steam. Accordingly, connections are made for the off-take of the heated water or the generated steam and for the replenishment of water. The heated water or generated steam can be used as a heating medium or as a working fluid in another device that converts thermal energy to mechanical work. The water also acts to cool the heat-absorbing surfaces of the boiler while the water circulates through the boiler. The heated water or generated steam, as the case may be, is removed at a controlled rate that is comparable to the rate of heat addition to the water so that the pressure in the water-vessel can be maintained at a desired, safe value.

A water-tube boiler is a particular type of boiler that includes a plurality of small-diameter, water-containing tubes arranged in a certain configuration to allow hot gases to pass over the outer surface of the tubes thereby transferring heat to the water contained inside the tubes. The water is confined in the small tubes such that the water flows upwards in a rapidly controlled manner. Water-tube boilers are typically economical for heat capacities greater than 20,000 pounds of steam per hour.

Evolution in water-tube boiler design for higher pressures and capacities has led to use of steel and increasing the length, number and orientation of the tubes. In particular, bent-tube, water-tube boilers are used for high-pressure designs. Bent-tube water-tube boilers terminate in upper and lower steam and water drums (also known as manifolds). The bent-tube water-tube boilers also have sloped tubes that reduce the possibility of steam pocket formation thereby increasing the rate of heat absorption.

Water-tube boilers can operate at an efficiency, defined by the ratio of thermal energy output to heat input, of up to 80 percent. However, to obtain a higher throughput of heated water or generated steam, either a higher efficiency boiler is needed, which, if conventionally designed, results in increased costs due to the need for additional more expensive equipment, or a larger boiler is needed which also results in increased costs due to the need for more material.

SUMMARY OF THE INVENTION

The inventors have realized that it is possible to increase the efficiency of a boiler by using a unique, parallel flow design in which the flow of the flue gas (i.e. hot gases) is parallel to the direction of at least a portion of the tube runs of the water tubes. This orientation allows for more direct radiant heat towards the water tubes resulting in greater heat transfer coefficients and improved system efficiency. In addition, the orientation allows for a smaller flow path, and thus a smaller size boiler, for producing the same amount of heat as compared to a larger, conventional boiler. The inventors have also found that it is advantageous to fire a flue gas flame directly towards an end wall composed of tubes of a portion of the tube assembly for more direct heat transfer as well as removing the need for refractory material in this portion of a boiler.

Accordingly, in one aspect, at least one embodiment of the invention provides a boiler comprising a housing with a flue gas inlet for receiving a hot gas flame and an outlet for venting a hot gas produced by the hot gas flame; and a tube assembly mounted within the housing. The tube assembly comprises a lower manifold for receiving a liquid, an upper manifold for receiving a heated version of the liquid; a downcomer pipe connecting the lower and upper manifolds for providing natural convective circulation of the liquid when a burner fires into the boiler; and, a plurality of tubes disposed between the lower and upper manifolds, a majority of the tubes being shaped to provide, in combination with adjacent tubes, a hot gas pathway that travels in a parallel fashion along the longitudinal extent of at least a portion of the majority of tubes in the tube assembly to the outlet. During use, the liquid introduced into the lower manifold travels in the plurality of tubes and receives heat from the hot gas along the extent of the hot gas pathway.

In another aspect, at least one embodiment of the invention provides a tube assembly for use in a boiler, the tube assembly comprising a lower manifold for receiving a liquid, an upper manifold for receiving a heated version of the liquid; a downcomer pipe connecting the lower and upper manifolds for providing natural convective circulation of the liquid when the boiler fires; and, a plurality of tubes disposed between the lower and upper manifolds, a majority of the tubes being shaped to provide a hot gas pathway that extends in a co-linear fashion with respect to some substantially linear portions of the majority of the tubes for transferring heat to the liquid as the liquid travels in the plurality of tubes from the lower manifold to the upper manifold when a burner fires a flue gas flame into the boiler during use.

In yet another aspect, at least one embodiment of the invention provides a tube assembly for use in a boiler, the tube assembly comprising: a lower manifold for receiving a liquid, an upper manifold for receiving a heated version of the liquid; a downcomer pipe connecting the lower and upper manifolds for providing natural convective circulation of the liquid when the boiler fires; and, a plurality of tubes disposed between the lower and upper manifolds, a majority of the tubes having a lower section and an upper section shaped to provide, in combination with adjacent tubes, a lower hot gas pathway and an upper hot gas pathway, the lower section of the majority of the tubes having a shape for guiding the lower hot gas pathway in a co-linear fashion with respect to substantially linear portions of the lower section of the majority of tubes for transferring heat to the liquid as the liquid travels in the tube assembly from the lower manifold to the upper manifold when a burner associated with the boiler fires a flue gas flame and wherein the lower section of the majority of the tubes provide a closed end wall for receiving the flue gas flame when the burner fires.

BRIEF DESCRIPTION OF THE DRAWINGS

For a better understanding of the invention and to show more clearly how it may be carried into effect, reference will now be made, by way of example only, to the accompanying drawings which show exemplary embodiments of the invention and in which.

DETAILED DESCRIPTION OF THE INVENTION

Figure 1:
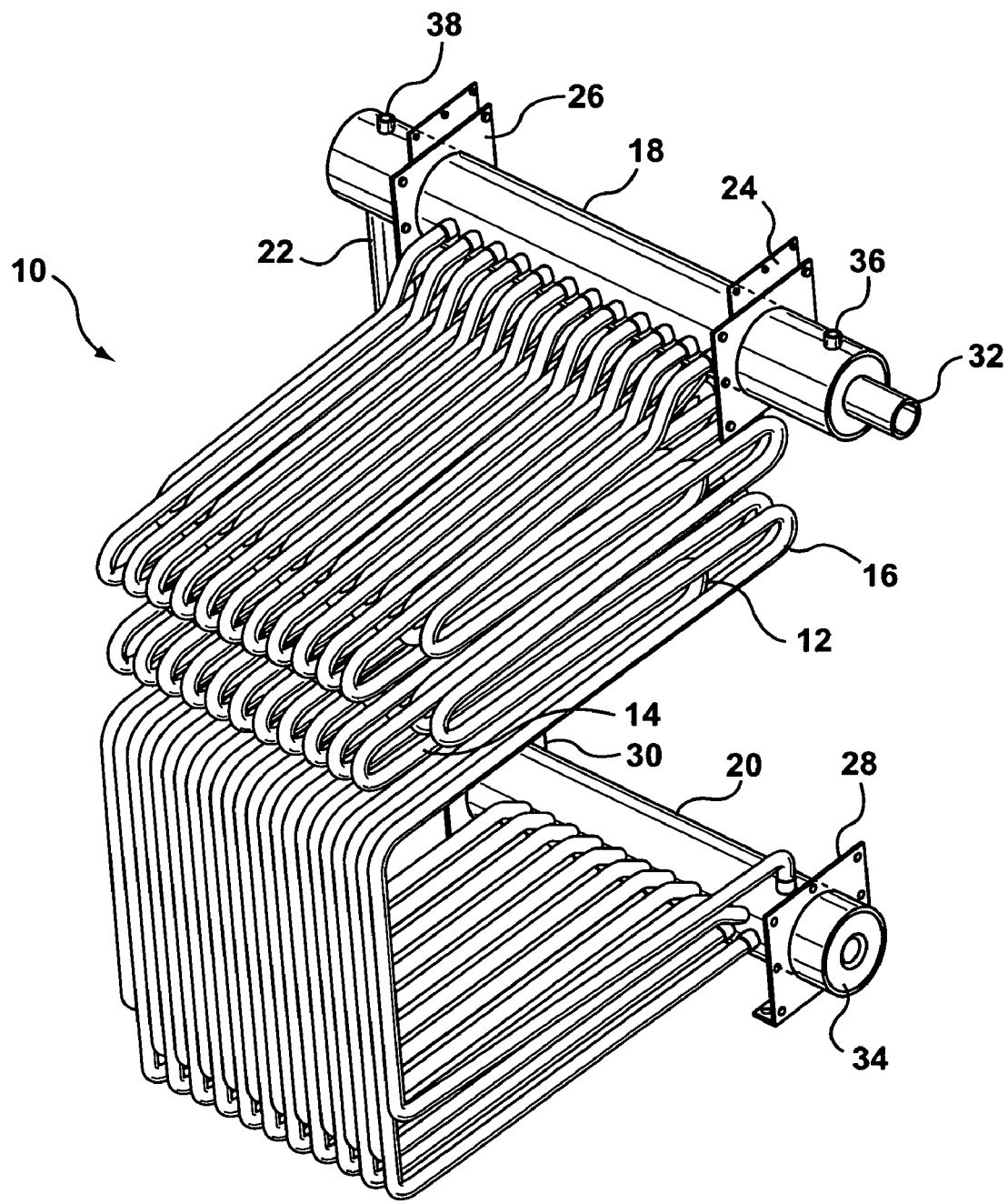
FIG. 1 is an isometric view of a tube assembly, in accordance with the invention, with upper and lower drums.

Referring now to FIG. 1, shown therein is a tube assembly 10, in accordance with the invention, for use in a boiler. The tube assembly 10 comprises a plurality of tubes of which there are generally three types, i.e. tube types 12, 14 and 16, which each have a unique shape. The shape and fashion in which the three different types of tubes 12, 14 and 16 are horizontally stacked to construct the tube assembly 10 results in improved heat transfer for flue gas pathways in a boiler which employs the tube assembly 10. This is discussed in further detail below and shown in FIG. 3.

The tube assembly 10 is connected to an upper drum (i.e. manifold) 18 and a lower drum (i.e. manifold) 20. The upper and lower drums 18 and 20 are also connected to each other by a downcomer pipe 22. The upper drum 18 and the lower drum 20 are generally in a horizontal configuration. The upper drum 18 also has support members 24 and 26 and the lower drum 20 has support members 28 and 30 for mounting the tube assembly 10 within a boiler housing. One end of the upper drum 18 and the lower drum 20 is sealed while the other end of the upper drum 18 has a connection member 32 and the other end of the lower drum 20 has a connection member 34.

The connection member 32 provides generated steam, heated water, or a combination of the two, as the case may be, to a prime mover or a heating device (both not shown). For ease of description, it is assumed that the tube assembly 10 is used to generate steam. The connection member 34 connects to a water source, or more generally a liquid source, such as a feedwater pump (not shown), for providing water to the tube assembly 10. Other types of liquids may be used such as a combination of water and glycol for example.

The upper drum 18 also has outlets 36 and 38. Outlet 36 may be used as a vent and outlet 38 may be used as a safety release valve in case the pressure within the tubes of the tube assembly 10 becomes too great. The size of the drums 18 and 20, even in relation to one another, may vary depending on the liquid source that is used in the boiler. The tubes, drums and connection members can be made of conventional boiler materials such as iron or steel.

In use, water is introduced into the lower drum 20 and sent into the tubes of the tube assembly 10. Concurrently, flue gas is passed along the exterior of the tubes of the tube assembly 10 so that the flue gas travels parallel to the water flow. As the water traverses the tubes of the tube assembly 10, heat is transferred from the flue gas to the water. Consequently, the water is heated to a suitable temperature depending on the application of the boiler which uses the tube assembly 10. In some cases, the water may be vaporized to a steam. The heated water and/or generated steam exits the tube assembly 10 and enters the upper drum 18 where the generated steam exits via the connection member 32. The heated water and/or generated steam is then used for a particular purpose such as for heating or as a prime mover as is commonly known by those skilled in the art.

Water that has not been converted to gas, or water in a hot boiler application, may also be present in the upper drum 18. This water is led back to the lower drum 20 via the downcomer pipe 22. The downcomer pipe 22 facilitates rapid circulation of water within the tube assembly 10 thereby eliminating the need for external pumping sources. The downcomer pipe 22 allows for natural convective circulation of the water within the tube assembly 10. When the burner associated with the boiler fires, the water in the portion of the tube assembly closest to the burner is rapidly heated which causes it to rise through convection even when there is no external source for flow. When the water rises, it pushes water that is in the upper part of the tube assembly 10 downwards through the downcomer pipe 22. In the absence of the downcomer pipe 22, this internal circulation will not occur since there will be nowhere for the water in the upper part of the tube assembly 10 to flow. The result would be stratified water, and the heat from the lower portion of the tube assembly 10 would have to transfer to the upper portion of the tube assembly 10 through conduction, which requires a longer period of time and may not result in uniform temperature distribution across the various tubes in the tube assembly 10 and will not cause any actual water flow within the tube assembly 10.

In contrast, the downcomer pipe 22 of the tube assembly 10 allows for natural convective flow to occur when the burner is fired. The benefit of having this natural flow through the tube assembly 10 is two-fold. This flow, as mentioned previously, occurs even when there is no external flow source. As such, if a control failure occurs causing the burner to fire while the pumps associated with the tube assembly 10 are not running, the water within the tube assembly 10 will circulate, resulting in the heating of all water contained within the tube assembly 10. Further, when the water elevates in temperature, it will quickly satisfy the operating control on the boiler outlet, which in turn will shut down the burner. Without this circulation, the water temperature sensed by the operating control will not rise, and thus the control at this location of the boiler will not shut down the burner. This will then result in over-heating of the boiler with potentially catastrophic failure of the tube assembly 10. The other benefit to having this natural circulation within the boiler during operation is that it promotes higher flow rates through the tube assembly 10 which in turn provides improved temperature distribution in the tube assembly 10. The end result is an improvement in the heat transfer characteristics of the boiler by operating with an increased water side heat transfer coefficient and therefore, a higher overall heat transfer coefficient. The higher overall heat transfer coefficient translates directly into higher boiler operating efficiency. Therefore, the downcomer pipe 22, by promoting natural internal circulation within the tube assembly 10, provides an increased level of protection for operating safety while simultaneously acting to increase the operating efficiency of the boiler.

Figure 2A:
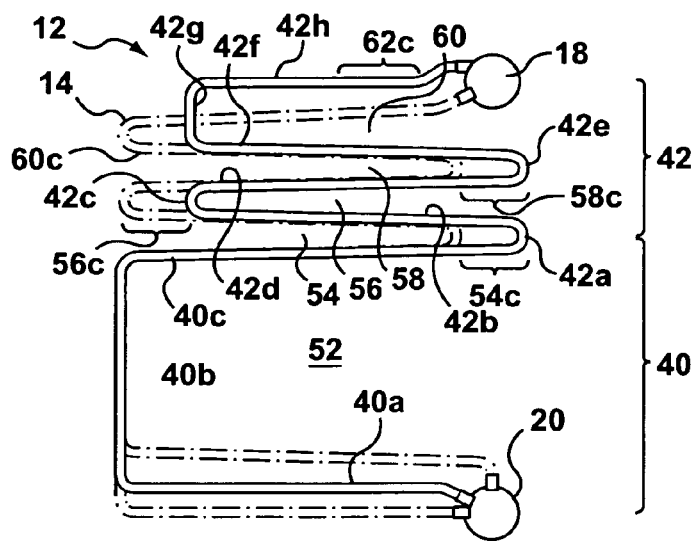
FIG. 2a is a side-view of a first type of tube used in the tube assembly of FIG. 1.
Figure 2B:
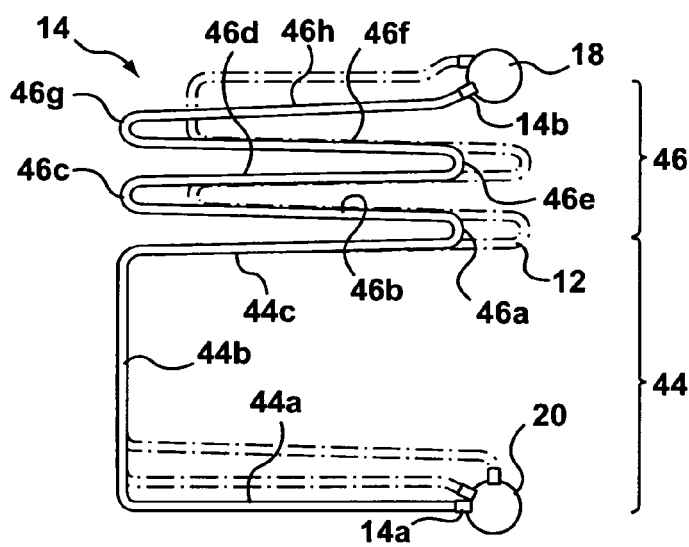
FIG. 2b is a side-view of a second type of tube used in the tube assembly of FIG. 1.
Figure 2C:
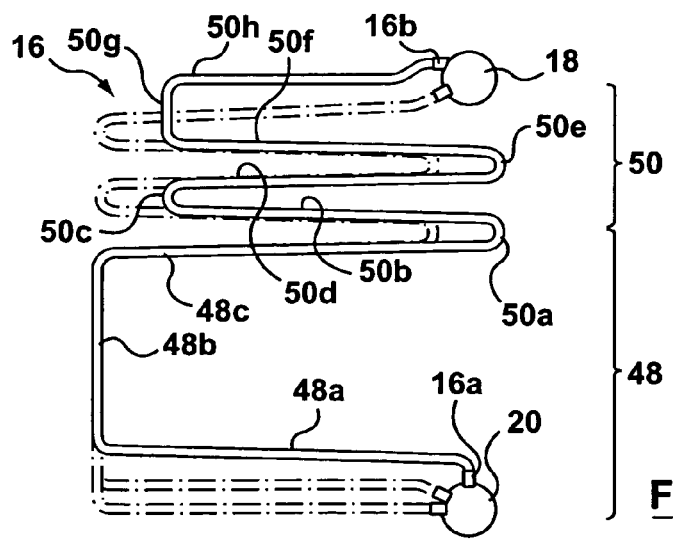
FIG. 2c is a side-view of a third type of tube used in the tube assembly of FIG. 1.

Referring now to FIGS. 2a–2c, shown therein are side-views of three different types of tubes 12, 14 and 16 that are employed in the tube assembly 10. In general, each tube type 12, 14, and 16 comprises a lower burner section, or C-shaped section 40, 44 and 48 and an upper section or sinuous section 42, 46 and 50 respectively. Using tube type 12 as an example, the C-shaped section 40 is sized to accommodate the introduction of a flue gas flame from a furnace (see FIG. 3). Accordingly, tube runs 40a and 40c of the C-shaped section 40 are spaced further apart from one another than tube runs 42b, 42d, 42f and 42h of the sinuous section 42. The increased size of the C-shaped section 40 also provides two passes for the flue gas flame that is introduced by the burner associated with the boiler than employs the tube assembly 10. For instance, the flue gas is introduced to the right of the C-shaped section 40, travels to the left and encounters tube run 40b at which point the flue gas travels upwards, encounters tube run 40c and then travels back to the right at which point the flue gas will encounter an entrance upward into the sinuous section 42.

The lateral tube runs 42b, 42d, 42f and 42h of the sinuous section 42 are connected to one another by precision bends 42a, 42c, 42e and 42g. The lateral tube runs of the sinuous section 42 have vertically smaller heights to compress the flue gas. This results in more contact between the flue gas and the tube runs of the sinuous section 42 which results in better heat transfer from the flue gas flame to the liquid within the tube runs in the sinuous section 42.

Further, in general, the lateral tube runs of the tube assembly 10 are slightly inclined to prevent air traps from being stationary within the tube assembly 10. The inclined nature of the tube assembly 10 enables air bubbles that are formed within the tube assembly 10 to rise to the top of the tube assembly 10 where the air bubbles can be vented.

Another feature of the tube types 12, 14 and 16 is that, in this exemplary embodiment, the lateral tube runs of the sinuous sections 42, 46 and 50 are shifted with respect to the C-shaped sections 40, 44 and 48 respectively. In the exemplary embodiment, for tube types 12 and 16, the sinuous sections 42 and 50 are offset towards the right of the C-shaped sections 40 and 48 respectively. However, for tube type 14, the sinuous section 46 is offset towards the left of the C-shaped section 44. Therefore, for a first tube type, the sinuous section is offset with respect to the C-shaped section in a first direction and for a second tube type, the sinuous section is offset with respect to the C-shaped section in a second direction where the first direction is generally opposite the first direction. Accordingly, when the first tube type is adjacent to the second tube type, the ends of the lateral tube runs of the sinuous sections of these tube types are horizontally staggered with respect to one another for connecting a lower flue gas pathway to an upper flue gas pathway as is described in more detail below.

Tube type 16 is a special tube known as a vent tube that is placed on either end of the tube assembly 10. Tube type 16 allows air within the lower manifold 20 to rise directly to the upper manifold 18 and be vented.

Each tube type 12, 14 and 16 also generally has a different connection point 12a, 14a and 16a, respectively, to the lower drum 20, and different connection points 12b, 14b and 16b, respectively, to the upper drum 18. The orientation of these connection points at different locations on the upper and lower drums 18 and 20 allows for all of the tubes of the tube assembly 10 to be connected to the upper and lower manifolds 18 and 20 without compromising the structural integrity of the manifolds 18 and 20.

The tube assembly 10 is made by horizontally stacking tubes together and alternating between tubes shaped according to tube type 14 and tube type 12 with two tubes shaped according to tube type 16 being used on either end of the tube assembly 10. For this reason, the lateral tube runs of the sinuous section of adjacent tubes do not have the same lateral extent, but are rather staggered, thereby providing an upward channel that is made from a plurality of upward slots through which the flue gas can rise from one lateral pathway to the next at alternating sides of the tube assembly 10. In addition, each tube in the tube assembly 10 is tightly disposed to an adjacent tube to provide a plurality of vertically superposed pathways 52, 54, 56, 58 and 60 for the flue gas to travel within the tube assembly 10. However, the tubes of the tube assembly 10 are also disposed with respect to one another such that one or more of the tubes can be removed and replaced if the tubes are damaged.

FIGS. 2a and 2b clearly show the staggered nature of the end portions of the sinuous sections of adjacent tubes (i.e. the end portions of the sinuous sections of adjacent tubes in the tube assembly are laterally offset with respect to one another). In FIG. 2a, using tube type 12 as an example, upward channels 54c and 58c are formed between tube type 12 in the foreground and tube type 14 in the background at the right side of the tube assembly 10 and upward channels 56c and 60c are formed between tube type 12 in the foreground and tube type 14 in the background at the left side of the tube assembly 10. This feature can also be seen in FIG. 1. However, the tube runs of the C-shaped sections 40, 44 and 48 of tube types 12, 14 and 16 are not staggered with respect to one another when these tube types are placed adjacent to one another. Rather, when the tube types 12, 14 and 16 are placed adjacent to one another, the C-shaped sections 40, 44 and 48 are tightly disposed to form a closed end wall and a closed upper wall that forces the flue gas to follow a C shaped path upwards to the sinuous sections 42, 46 and 50 when the flue gas is introduced to the right of the C-shaped sections 40, 44 and 48. This feature may also be referred to as a return-flame design. In addition, the C-shaped sections 40, 44 and 48, when the tube types 12, 14 and 16 are placed adjacent to one another, provide a combustion chamber for a flue gas flame. Further, since the flue gas flame is introduced to the right of the tube assembly 10 and encounters the closed end wall of the tube assembly 10, i.e. sections 40b, 44b and 48b of tube types 12, 14 and 16, there is no need for any refractory material in the boiler which employs the tube assembly 10. Further, the liquid in the closed end wall portion of the tube assembly 10 at least partially absorbs the heat from the flue gas flame when the flue gas flame is initially fired into the boiler. This results in a more efficient boiler since the heat from this initial firing is not wasted by firing on an end wall of refractory material as in other conventional boilers.

Although the lateral tube runs of the sinuous sections 42 and 50 of tube types 12 and 16 have a different lateral extension (due to a lateral shift) with respect to the tube runs of the sinuous section 46 of tube type 14, it is preferable that the lateral tube runs of tube types 12, 14 and 16 have the same lateral length. This is beneficial since the water traveling within these tubes will travel the same distance and arrive at the upper drum 18 at roughly the same time. This feature encourages a uniform temperature distribution across all tube types 12 and 14 used in the tube assembly 10.

Figure 3:
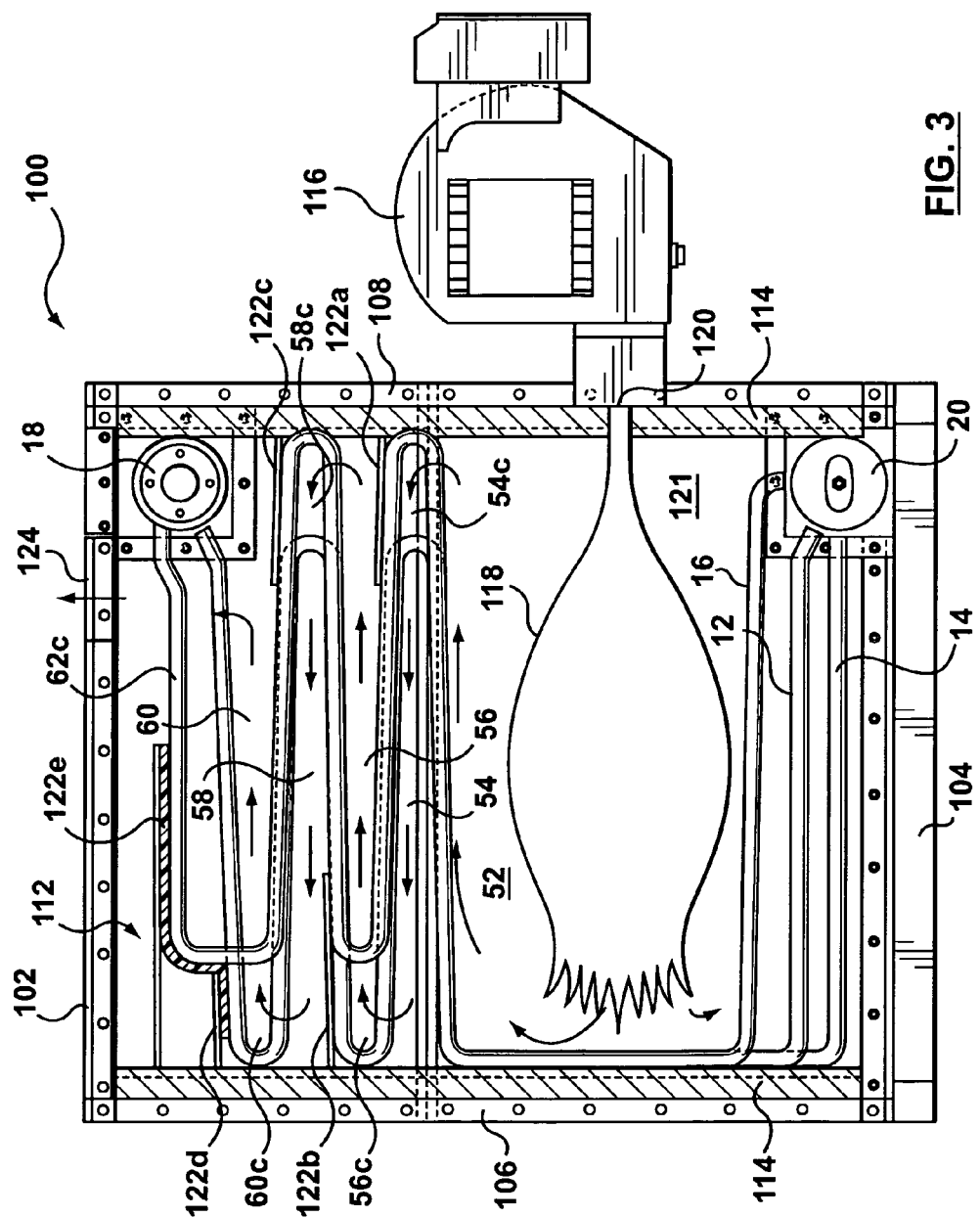
FIG. 3 is a sectional side-view of the flue gas path in a boiler that employs the tube assembly of FIG. 1.
Figure 4:
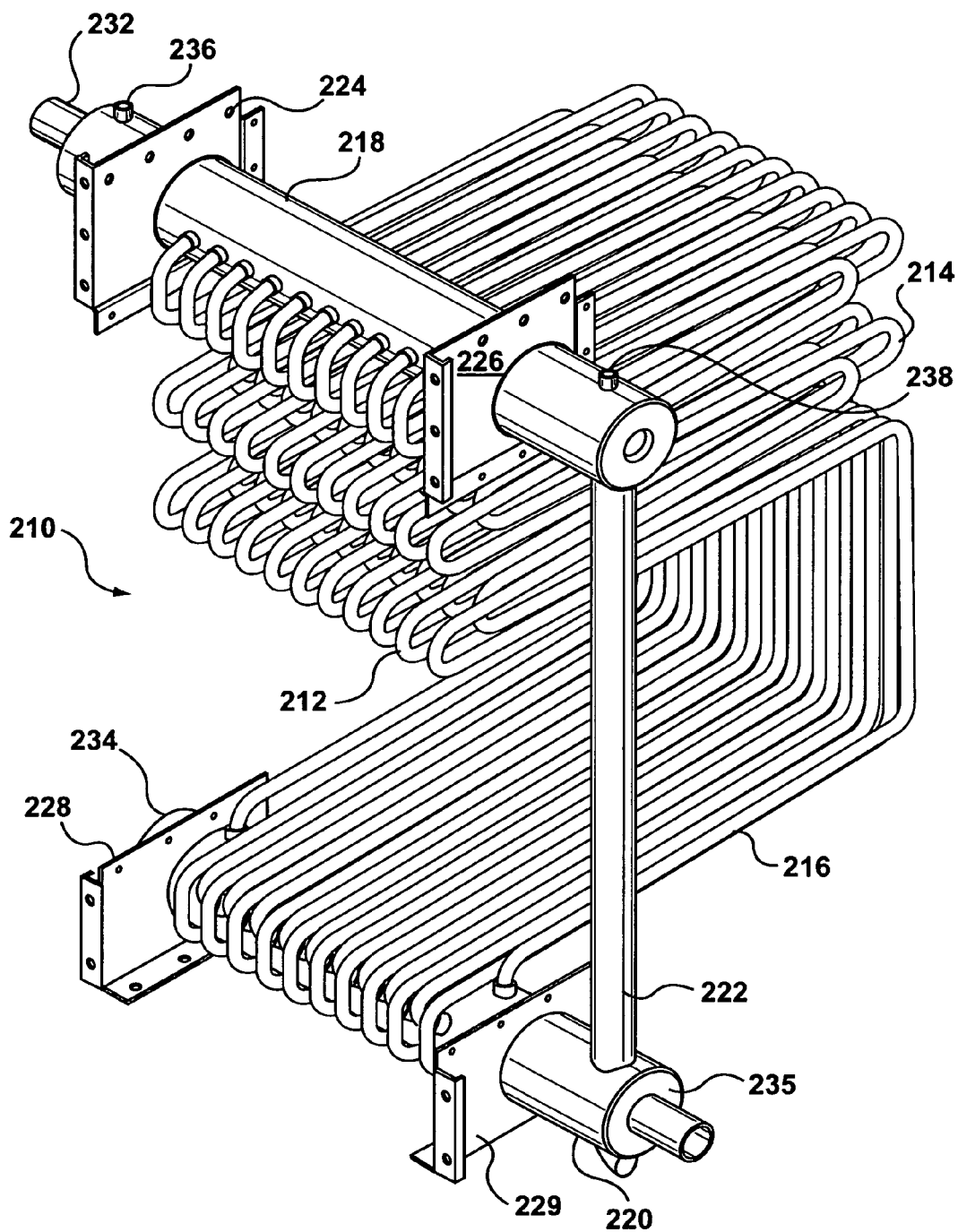
FIG. 4 is an isometric view of an alternative embodiment of a tube assembly, in accordance with the invention, with upper and lower drums.
Figure 5B:
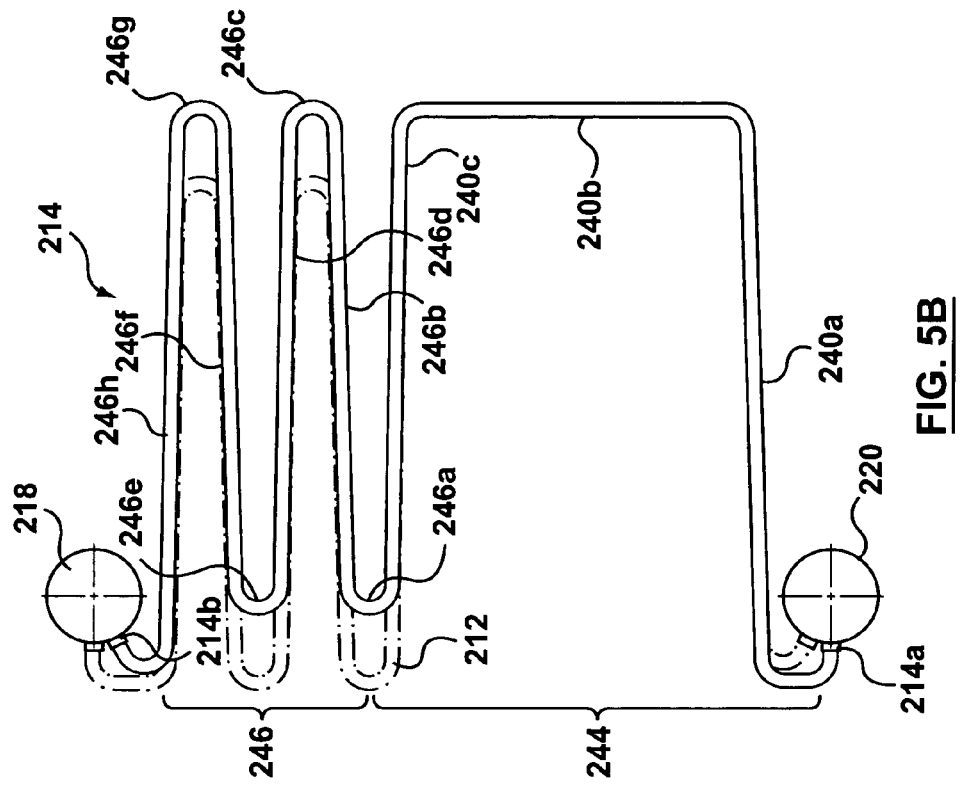
FIG. 5b is a side-view of a second type of tube used in the tube assembly of FIG. 4.
Figure 5A:
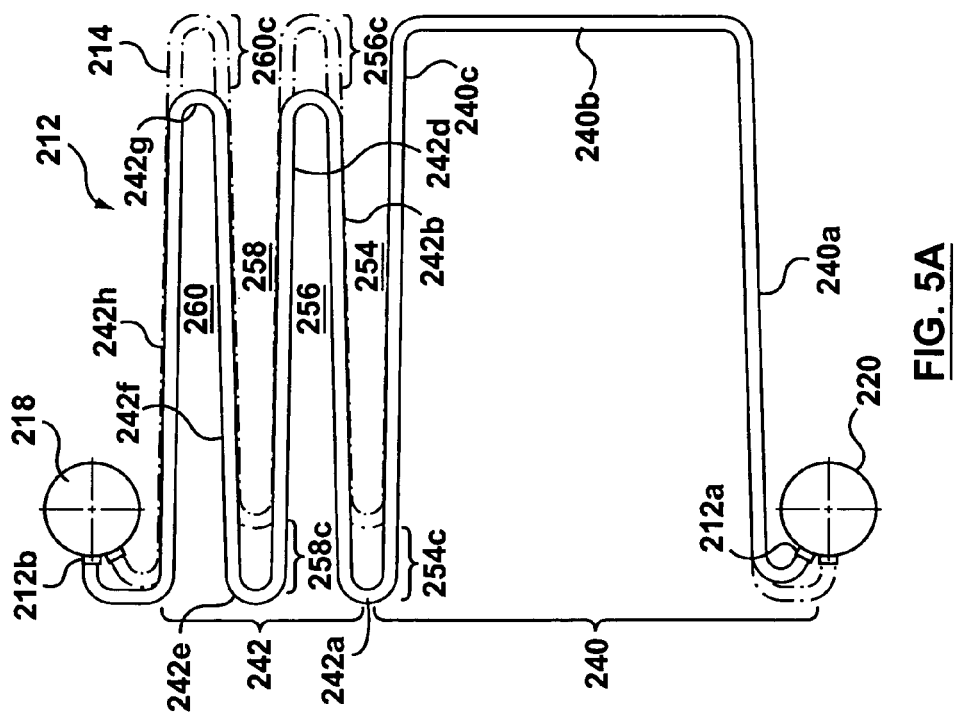
FIG. 5a is a side-view of a first type of tube used in the tube assembly of FIG. 4.
Figure 5C:
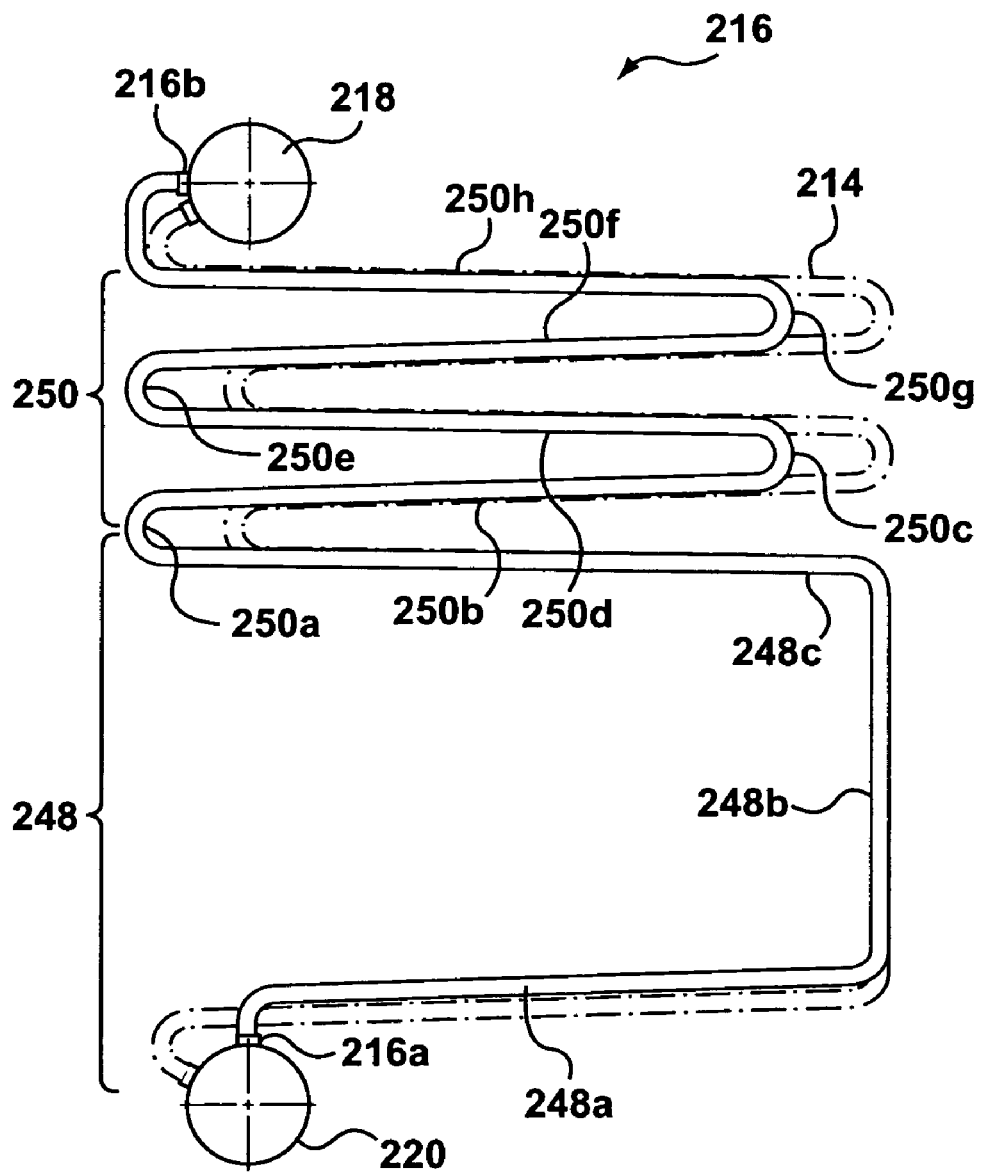
FIG. 5c is a side-view of a third type of tube used in the tube assembly of FIG. 4.
Figure 6:
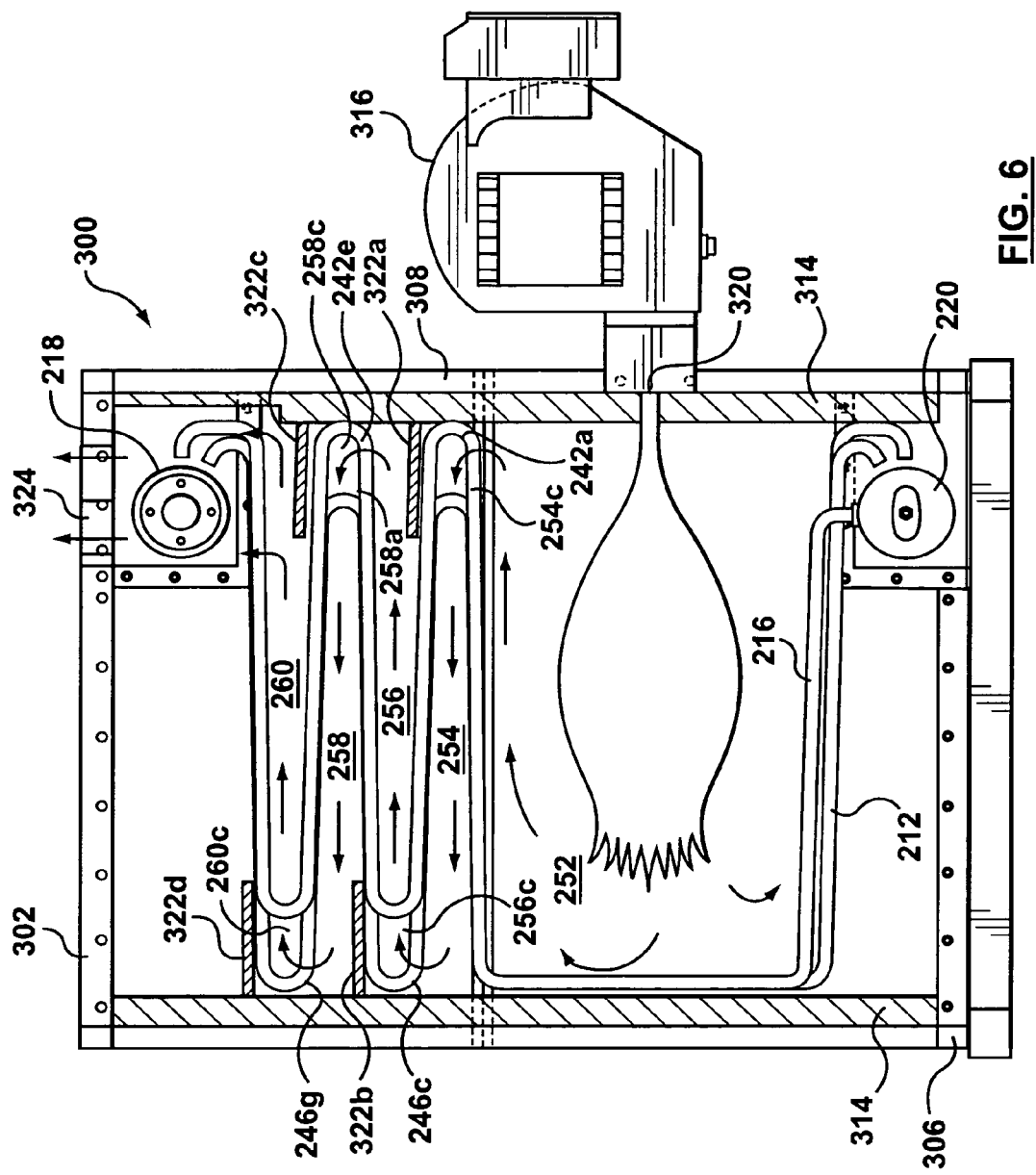
FIG. 6 is a sectional side-view of the flue gas path in a boiler that employs the tube assembly of FIG. 4.
Figure 7:
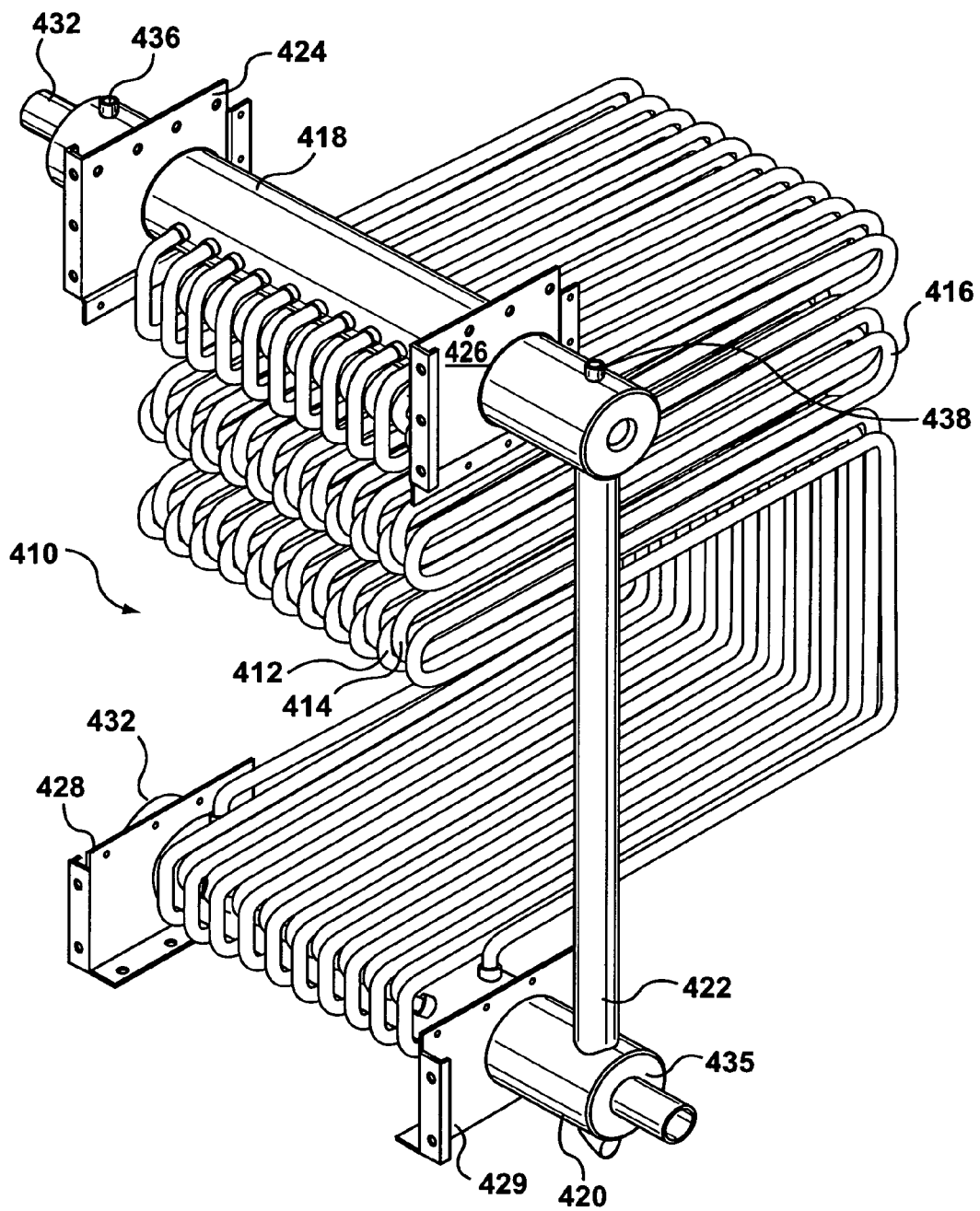
FIG. 7 is an isometric view of another alternative embodiment of a tube assembly, in accordance with the invention, with upper and lower drums.
Figures 8A, 8B:
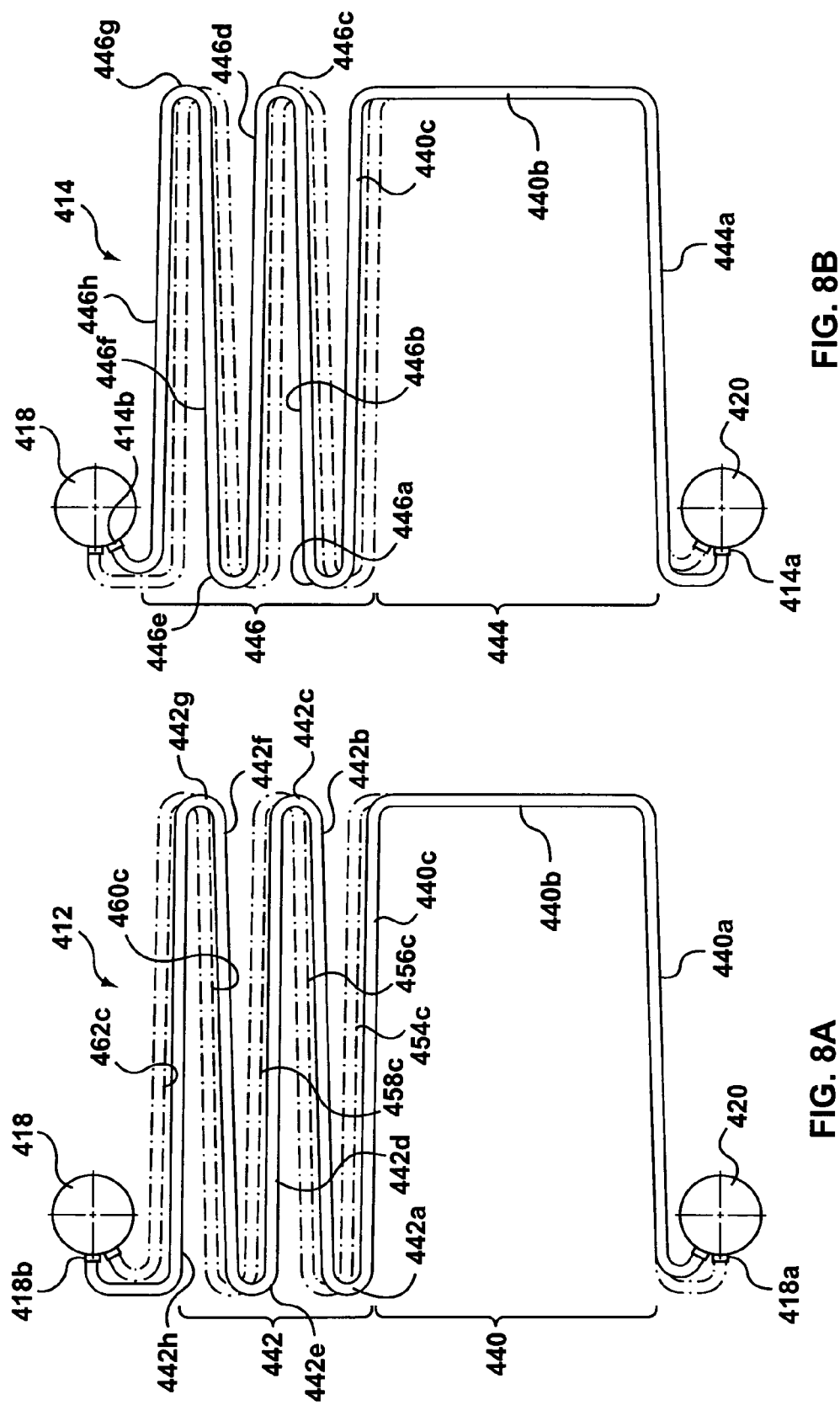
FIG. 8a is a side-view of a first type of tube used in the tube assembly of FIG. 7.
FIG. 8b is a side-view of a second type of tube used in the tube assembly of FIG. 7.
Figure 8C:
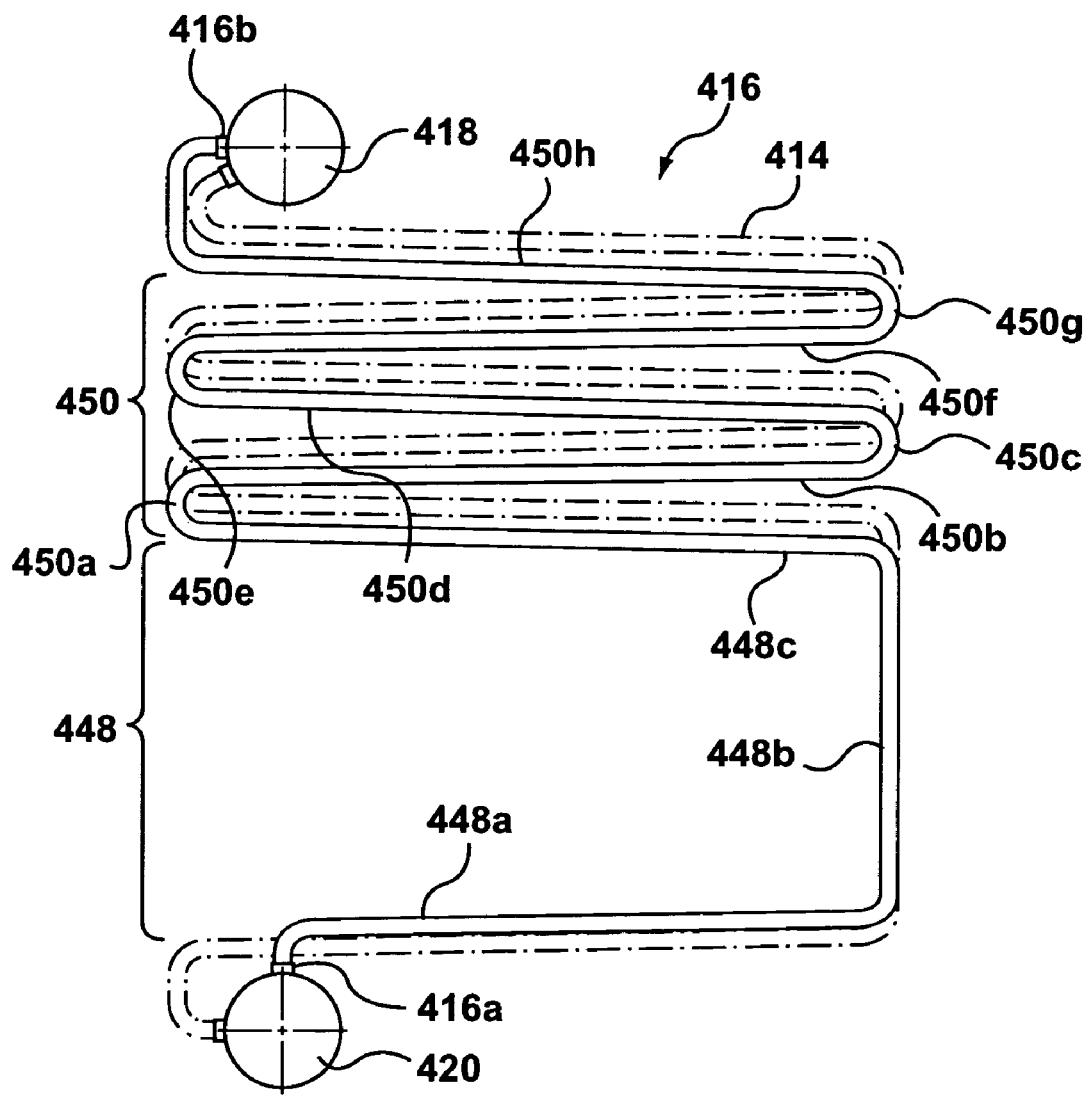
FIG. 8c is a side-view of a third type of tube used in the tube assembly of FIG. 7.
Figure 9:
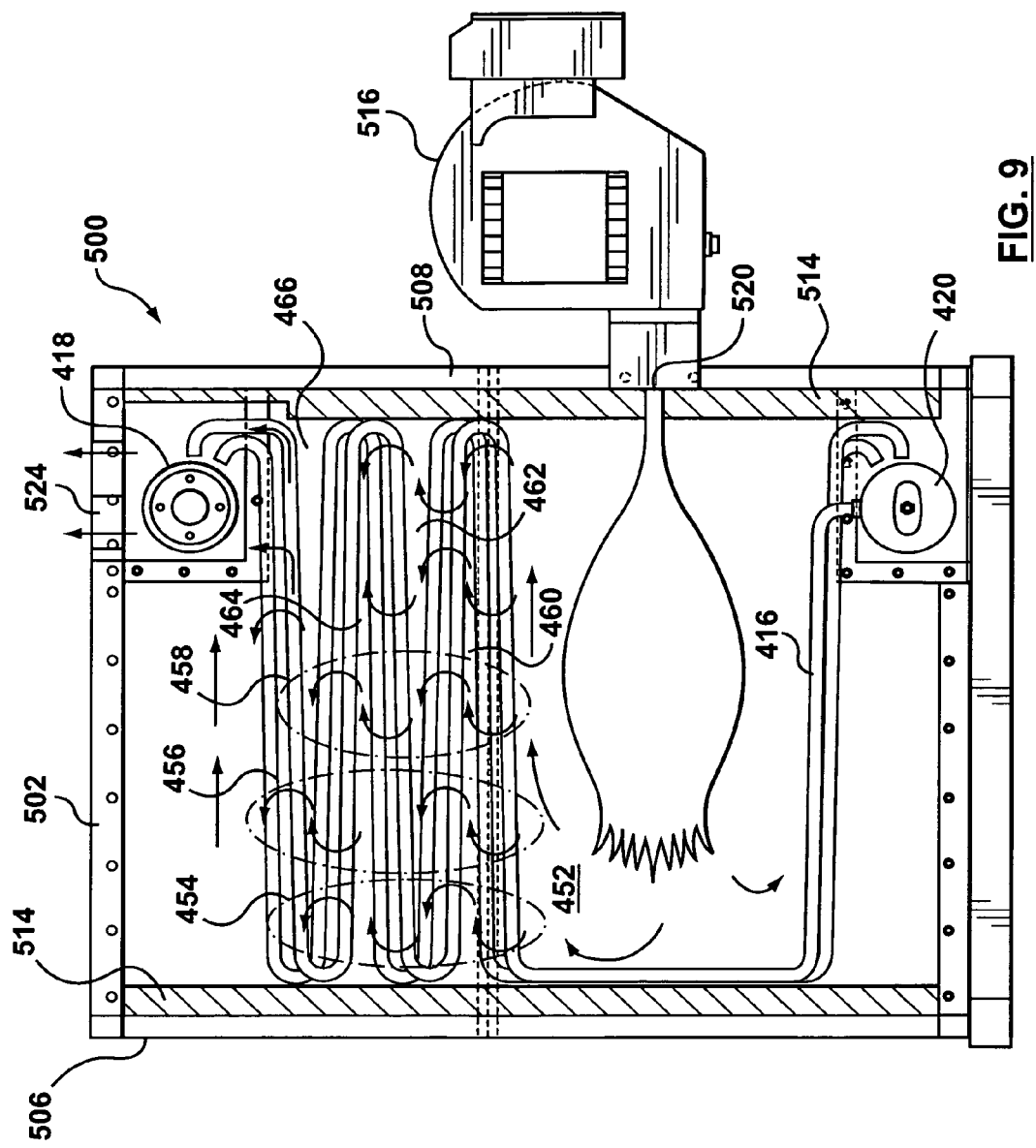
FIG. 9 is a sectional side-view of the flue gas path in a boiler that employs the tube assembly of FIG. 7.

In addition, a blocking member (not shown) can be placed on the upper portions of tube type 12 that loop back over above channels 54c and 58c to ensure that the flue gas follows the flue gas paths 54, 56, 58 and 60 in proper succession. A similar blocking member (not shown) can be placed on the upper portions of tube type 14 that loop back over above channels 56c and 60c. An example of a blocking member is shown in FIG. 3. The blocking member may be made from a material that can withstand the high temperatures within a boiler such as a ceramic material. The blocking member may also be made from an insulating material. In addition, it should be understood that vertical plates, such as the housing of a boiler for example are placed at the left and right side of the tube assembly 10 so that the flue gas pathway is a closed pathway.

Another feature of the tube assembly 10, is that the tube run 42h of tube type 12 is higher than the tube run 46h of tube type 14 so that when these tube types are adjacent to one another, a plurality of slots are formed to provide an exhaust channel 62c. The exhaust channel 62c allows the flue gas to exit the flue gas pathways of the tube assembly 10. This feature of tube types 12 and 14 is also shown in FIG. 1. Various blocking members may be placed in a horizontal or vertical fashion with respect to the top tube runs 42h and 46h to vary the size of the exhaust channels 62c. Accordingly, these blocking members allow one to control the rate at which the flue gas exits the tube assembly 10.

In the exemplary embodiment shown in FIGS. 1 and 2a–2c, there are 5 flue gas pathways and 23 tubes that are used to construct the tube assembly 10. However, it should be apparent to one skilled in the art that a greater or fewer number of tubes can be used to construct the tube assembly 10 so that the tube assembly 10 can be used with a boiler of a given size. Further, the number of bends and lateral tube runs in the sinuous section 42, 46 and 50 of the tube types 12, 14 and 16 can be varied to provide more or less flue gas pathways. In addition, the diameter of the tubes in the tube assembly 10 can also be varied.

The tube assembly 10 provides a number of advantages. Firstly, the pathways 52, 54, 56, 58 and 60 that are followed by the flue gas are parallel with the longitudinal extent of the tubes in the tube assembly 10. This allows the flue gas to flow over a greater surface area of the tubes of the tube assembly 10 to transfer more heat to the water contained within the tubes. This is in contrast to prior art tube assemblies in which the flue gas flows perpendicularly to the longitudinal extent of the tubes. This is also true in the lower section or C-shaped section of the tube assembly 10 which is configured to provide a combustion chamber for combustion of the flue gas. In particular, when the burner associated with the boiler that houses the tube assembly 10 fires, the flue gas travels towards the end wall formed by tube runs 40b and 44b transferring heat to the liquid in tube runs 40a and 44a along the way and then reversing and travelling along the outside of the tube runs 40c and 44c and then up to the sinuous sections 42 and 44. This results in lower thermal losses which improves the efficiency of a boiler which employs the tube assembly 10. Other conventional boilers do not provide an end wall made of tube runs that the burner fires against. Further, using tube type 12 as an example, the upward channels 54c, 56c, 58c and 60c allows the flue gas to flow upwardly along the bends of the tube types 12 and 14 (i.e. sections 42a, 42c, 42e, 42g, 46a, 46c, 46e and 46g). These upward channels also allow the flue gas to flow upwardly along the portions of the tube runs 40c, 42b, 42d and 42e of tube type 12 that laterally extend further than the bends of the adjacent tube type 14 on the right side of the tube assembly 10 and the portions of the tube runs 44c, 46b, 46d, 46f and 46h of tube type 14 that laterally extend further than the bends of the adjacent tube type 12 on the left side of the tube assembly 10.

Referring now to FIG. 3, shown therein is a sectional side-view of a boiler 100 that employs the tube assembly 10 of the invention. The boiler 100 has a housing with a top wall 102, a bottom wall 104, a front wall 106 and a rear wall 108. The boiler 100 also has a right side wall (not shown) and a left side wall 112. The housing is gas tight with easily removable panels to facilitate inspection, cleaning and service of the boiler 100 and the tube assembly 10. The housing is preferably made of steel, however, iron or other conventional boiler materials may also be used as is commonly known by those skilled in the art. The housing also includes an insulator 114 which is disposed along the front 106, rear 108, right side and left side 112 walls. The insulator 114 can be made of any suitable material such as a ceramic fiber material, mineral board or mixed refractory material.

The boiler 100 is connected to a furnace 116 that provides an ignition chamber for burning fuels or gases thereby generating a flue gas flame 118. Accordingly, the boiler 100 has a flue gas inlet 120 that is located on the rear wall 108 of the housing to allow the flue gas flame 118 to enter the boiler 100. The C-shaped section of the tube assembly 10 provides a combustion chamber 121 to accommodate the flue gas flame 118. Various sources of fuel can be burnt by the furnace 116 such as natural gas, propane, sewer, waste oils, #2 oil, type "A" Jet fuel, light oil, residual oils, crude oils, certain types of coal and the like. Various types of burners may also be used including pressure atomizing and air atomizing burners.

The tube assembly 10 is oriented within the boiler 100 such that the flue gas flame 118 is introduced into the C-shaped section of the tube assembly 10 and parallel to the longitudinal extent of the lateral tube runs in the tube assembly 10. The flue gas pathway, indicated by the solid block arrows, begins at pathway 52 which coincides with the combustion chamber 121. The flue gas pathway then reverses, counter to the origin of the flue gas 118, upwards towards the channel 54c and is then forced up into the second pathway 54 by a blocking member 122a and a series of precision bends. The flue gas pathway then reverses again and travels up through channel 56c and is forced by blocking member 122b to flow laterally along the tube runs adjacent to the third pathway 56 of the tube assembly 10. At this point, the flue gas pathway reverses again and travels up through channel 58c and is forced by blocking member 122c to flow laterally along the tube runs adjacent to the fourth pathway 58. At this point, the flue gas pathway reverses again and travels up through channel 60c and is forced by blocking member 122d to flow laterally along tube runs adjacent the fifth pathway 60. At this point, the flue gas pathway extends upwards through channel 62c and exits the boiler 100 via exhaust 124. The lateral extent of the blocking member 122e controls the rate at which the flue gas exits the tube assembly 10.

The blocking members 122a–122e are provided for channeling the flow of the flue gas. The blocking members 122a–122e are generally formed by a material that can withstand the temperatures within the boiler 100. However, the blocking members 122a–122e can also be formed from an insulator such a wool-board or a ceramic fiber board. The blocking members 122a–122e are preferably a readily available material that can be quickly removed and replaced if the boiler 100 requires servicing. Preferably, the blocking members 122a–122c are wool boards and the blocking members 122d and 122e are a combination of wool board and ceramic fiber board (i.e. material that is able to withstand higher temperatures such as 2700° C., for example, are used in the lower section of the tube assembly 10, while material that is able to withstand slightly lower temperatures such as 1900° C. can be used in the upper section of the tube assembly 10 where the flue gas has cooled down somewhat). Advantageously, the blocking members 122a–122e provide the needed insulation without requiring the use of castable refractory material which is a relatively expensive and heavy material and is also a known carcinogen. It should also be noted that the insulation 114 on the front 106 and rear 108 walls and side walls of the housing are in close proximity with the edges of the tube assembly 10 to provide closure to the flue gas pathway. This insulation may be made from k-wall blanket material.

The design of the tube assembly 10 allows for more direct radiant heat to be absorbed by the water in the tubes of the tube assembly 10 which results in greater heat transfer coefficients and improved system efficiency for the boiler 100. This is due in part to the parallel flow nature of the tube assembly 10 in which the fuel gas travels in a parallel fashion in both the lower C-shaped section as well as the upper sinuous section of the tube assembly. Furthermore, the tube assembly 10 does not require turbulator baffles in the flue gas pathways as is done in conventional boiler designs. This reduces the cost of the tube assembly 10 as well as simplifies the maintenance of a boiler which employs the tube assembly 10.

The generated heat in the steam or water in the boiler 100 is maintained at a safe desired pressure by using a draft control to provide the necessary amount of back-pressure. The draft control is separate from the boiler and varies depending on the size of the chimney to which the boiler 100 is attached.

In addition, the horizontal stacking of the tubes in the tube assembly 10 provides an added safety measure for the expansion or contraction of the tubes due to the heat of the flue gas to prevent thermal shock. The tube assembly 10 can expand and shrink in the lateral and vertical directions. Accordingly, the insulation which surrounds the tube assembly 10 and lines the walls of the boiler 100 is preferably somewhat compliant to accommodate the change in dimension of the tube assembly 10 in use.

The boiler 100 also provides for balanced water flow and heat transfer. This is because the water flow is balanced in each of the tubes of the tube assembly 10 and each tube experiences the same heat distribution from the bottom of the tube to the top of the tube. This is achieved by using the same tube length for each tube as well as the same general configuration for the tubes in the tube assembly 10.

In addition, due to the improved heat transfer of the boiler 100, a lower volume of liquid is needed for the lower drum 20 compared to conventional boilers. This is advantageous since a low volume of liquid can be quickly heated up. Thus, the boiler 100 can provide a rapid response to swinging heat loads. Conventional boilers are bigger and more inefficient and therefore require more liquid and take a longer amount of time to respond to changing load conditions.

Due to the increased efficiency of the tube assembly 10, and the lower amount of required liquid, the boiler 100 can be made smaller and is lighter than conventional boilers that provide the same amount of heat output. In fact test results indicate that the performance of the boiler 100 is similar to that of larger, conventional boilers. The number of tubes required in the tube assembly 10 is less than a third of the required tubes of other conventional boilers for the same amount of heat input. Further, the tubes themselves simplify the manufacture of the tube assembly 10 since there are only three different types of configurations for the tubes. In addition, since no refractory material is needed, the weight of the boiler is further reduced. This in turn reduces the requirements of the boiler room which houses the boiler 100. For instance, the boiler 100 may weigh about 5,000 pounds and five of them may be installed in a boiler room for a total weight of 25,000 pounds. This is in contrast to conventional boilers which, for the same heat output, weigh about 15,000 pounds and five of them may be installed in a boiler room for a total weight of 75,000 pounds.

The various structural components of the boiler 100 have been designed in accordance with the following construction codes: a) ASME CODE SECTION IV, 2001 EDITION, 2003 ADDENDA, b) ASME B31.1-2001, 2003 ADDENDA, POWER PIPING, and c) CSA B51 LATEST EDITION. The boiler 100 has also been designed to withstand a pressure of 160 psi within the vessel which includes the tubes, manifolds 18 and 20 and downcomer pipe 22 of the tube assembly 10. The boiler 100 can operate up to a temperature of 250° F. and a maximum water temperature of 250° F. The boiler 100 was tested with a hydro test pressure of 240 psi, and a minimum hydro test temperature of 60° F. In one exemplary embodiment, the materials and the corresponding maximum allowable stress values were: a) for the housing: SA-53-B ERW with a maximum allowable pressure of 10,200 psi, b) for the manifolds: SA-516-70 with a maximum allowable pressure of 14,000 psi and c) for the tubes: SA-178-A with a maximum allowable pressure of 8,000 psi.

The boiler 100 can be used in any application that requires a boiler for providing heat such as large buildings, industrial plants, residential buildings, schools, hospitals, etc.

Referring now to FIGS. 4, 5a–5c and 6, shown therein is an alternative embodiment of a tube assembly 210, having tube types 212, 214 and 216 in accordance with the invention, placed within a boiler 300. The tube assembly 210 is similar to tube assembly 10 and reference numerals offset by 200 designate similar elements. More particularly, for the tube assembly 210, the lower C-shaped section also provides an end wall made of tubes that the burner fires towards rather than a refractory wall as in conventional boilers. In addition, the flue gas path is parallel to the tube runs of each tube in the tube assembly 210 and the horizontally staggered design is used for adjacent tubes to provide a plurality of channels that connect one flue gas pathway to the next upper flue gas pathway.

The tube assembly 210 does differ from the tube assembly 10 in that the connections made between the tubes of the tube assembly and the upper and lower manifolds 218 and 220 respectively, are made on a front side of the manifolds 218 and 220 and the tubes then loop back to the second side of the manifolds 218 and 220. This is beneficial for maintenance of the boiler 300 since the location of these connections is more accessible by a maintenance person. In addition, the tube runs 240a and 440a along the bottom portion of the C-section of the tube assembly 210 are also at the same height to form a closed "floor". Furthermore, the upper portion of the tube types 214 and 216 are at the same height to provide another flue gas pathway 260 for the majority of tube runs 242h and 246h. This confines the gas to the flue gas pathway 260 for a longer portion of the tube runs 242h and 246h, in comparison to the tube assembly 10, so that more heat is transferred to the liquids in the tube runs 242h and 246h. This also reduces the size of the blocking member needed for the 322d needed for the top flue gas pathway.

Referring now to FIGS. 7, 8a–8c and 9 shown therein is an alternative embodiment of a tube assembly 410, having tube types 412, 414 and 416 in accordance with the invention, for use in a boiler 500. The tube assembly 210 is somewhat similar to tube assembly 10 and reference numerals offset by 400 designate similar elements. More particularly, for the tube assembly 410, the lower C-shaped section also provides an end wall made of tubes that the burner fires directly towards rather than a refractory wall as in conventional boilers. In addition, the flue gas path is parallel to the tube runs of each tube along the lower floor and end wall of the C-shaped section in the tube assembly 410. The tube types 412 and 414 make similar connections to the upper and lower manifolds 418 and 420 as in the case of tube assembly 210. Further, the tube runs 440a and 44a in the lower floor of the C-shaped section are also level with one another as in the case of tube assembly 210.

However, rather than horizontally staggering the adjacent tube types in the sinuous section of the tube assembly 410, adjacent tube types 412 and 414 are vertically staggered with respect to one another in the sinuous sections 442 and 446. Accordingly, rather than providing horizontally-defined sinuous flue gas pathways in which a major portion of each flue gas pathway in the sinuous sections of tube assemblies 10 and 210 is horizontal and then travels upwards to the next pathway, the flue gas pathways in the sinuous section of tube assembly 410 are both vertical and horizontal in that the flue gas rises vertically, encounters a portion of tube run 412 or 414 and then moves to the left or right to rise up to encounter the next portion of tube run 412 or 414. There are a plurality of such vertical sinuous pathways, three of which are labeled for simplicity 454, 456 and 458. The flue gas may also follow a portion of the horizontal pathways 460, 462, 464 and 466 before rising up vertically. In addition, although not shown in FIG. 9, blocking members may be used in various sections of the tube assembly 410 to ensure that the flue gas is in contact with a majority of the tube runs of the tube assembly 410.

The features and advantages discussed above for the tube assembly 10 and the boiler 100 also generally apply to the tube assemblies 210 and 410 and boilers 300 and 500. Furthermore, generally speaking, it is may not be necessary that each tube in the tube assemblies 10, 210 and 410 provide the lower C-shaped section and the upper sinuous section but that the majority of the tubes in the tube assemblies 10, 210 and 410 provide these shapes and that the majority of adjacent tubes provide the horizontal or vertical offset for providing upwardly extending channels. Further, each tube can be generally considered to have a lower section that coincides with the C-shaped portion and an upper section that corresponds to the sinuous shape.

It should be understood that various modifications can be made to the embodiments described and illustrated herein, without departing from the invention, the scope of which is defined in the appended claims. For instance, the lateral extent of the sinuous section of the tube assemblies 10, 210 and 410 may be varied with respect to the lower C-shaped section such that the edges of at least one of the lateral ends of the sinuous section is not coterminous with the edges of the C-shaped section. For instance, the top sinuous portion of the tube assembly may be wider or narrower than the lower C-shaped section so that the boiler that houses the tube assembly need not be rectangular or square.

The invention claimed is:

1. A boiler comprising:
   a) a housing with a flue gas inlet for allowing a flue gas flame to enter the boiler and an outlet for venting a flue gas produced by the flue gas flame;
   b) a tube assembly mounted within the housing, the tube assembly comprising:
      i) a lower manifold for receiving a liquid,
      ii) an upper manifold for receiving a heated version of the liquid;
      iii) a downcomer pipe connecting the lower and upper manifolds for providing natural convective circulation of the liquid when a burner fires into the boiler;
      iv) a plurality of tubes disposed between the lower and upper manifolds, wherein a majority of the plurality of tubes include lateral tube runs having a longitudinal extent oriented substantially perpendicular to the plane of the flue gas inlet and, the plurality of tubes being shaped to provide, in combination with adjacent tubes, a flue gas pathway oriented in a parallel fashion with respect to at least a portion of the length of the tube runs along the longitudinal extent of the majority of the plurality of tubes in the tube assembly to the outlet; and
      v) a plurality of blocking members generally oriented horizontally with respect to the longitudinal axis of the lateral tube runs and located on a portion of some of the lateral tube runs to restrict the vertical extent of the flue gas thereat, wherein, during use, the liquid introduced into the lower manifold travels in the plurality of tubes and receives heat from the flue gas flow along the extent of the flue gas pathway.

2. A boiler as claimed in claim 1, wherein the majority of the plurality of tubes in the tube assembly comprise a C-shaped section connected at one end to the lower manifold, and a sinuous section connected to the C-shaped section and the upper manifold, wherein, collectively, the exterior of the C-shaped sections of the majority of the plurality of tubes provide both a combustion chamber for the flue gas flame and a closed end wall disposed with respect to the flue gas inlet such that in use the flue gas flame is generally directed towards the closed end wall when the burner fires into the boiler.

3. A boiler as claimed in claim 2, wherein the sinuous section of the majority of the plurality of tubes comprise a plurality of lateral tube runs connected and vertically spaced apart from one another by tube bends to provide, in combination with adjacent tubes, lateral flue gas pathways that are vertically superposed with respect to one another, and wherein end portions of the sinuous sections of adjacent tubes in the tube assembly are laterally offset with respect to one another to provide, in use, upward channels for the flue gas pathway with respect to a wall of the boiler, wherein each upward channel connects a lower lateral flue gas pathway to an upper lateral flue gas pathway, and wherein each of the blocking members are located on the end portion of some of the laterally offset sinuous sections of the adjacent tubes to restrict the vertical extent of the upward channels.

4. A boiler as claimed in claim 3, wherein a majority of adjacent tubes in the tube assembly are tightly spaced to prevent the passage of flue gas there between.

5. A boiler as claimed in claim 4, wherein the housing includes front, rear and side walls, each wall being tightly disposed with respect to the tube assembly to close off the flue gas pathway.

6. A boiler as claimed in claim 3, wherein portions of the majority of the plurality of tubes of the tube assembly form a closed upper wall in the C-shaped section prior to a first upward channel.

7. A boiler as claimed in claim 6, wherein portions of the majority of the plurality of tubes of the tube assembly form a closed lower wall in the C-shaped section.

8. A boiler as claimed in claim 3, wherein portions of the majority of the plurality of tubes of the tube assembly form a closed upper wall for most of the topmost lateral flue gas pathway in the sinuous section of the plurality of tubes.

9. A boiler as claimed in claim 2, wherein the sinuous section of the majority of the plurality of tubes comprise a plurality of lateral tube runs connected and vertically spaced apart from one another by tube bends to provide lateral flue gas pathways that are vertically superposed with respect to one another, and wherein the lateral tube runs in the sinuous section of hot gas pathways for the majority of adjacent tubes are vertically disposed with respect to one another to also provide vertical extending sinuous flue gas pathways.

10. A boiler as claimed in claim 1, wherein at least one of the blocking members is formed from an insulating material including one of: a wool board, and a ceramic fiber.

11. The boiler as claimed in claim 1, wherein the plurality of tubes comprise a lower C-shaped section and an upper sinuous section and the sinuous section of adjacent tubes of the majority of plurality of tubes are one of: horizontally and vertically shifted portions, with respect to one another.

12. The boiler as claimed in claim 1, wherein the boiler includes a removable panel and the plurality of tubes are only connected to one side of the lower and upper manifolds.

13. A tube assembly for use in a boiler having a flue gas inlet, the tube assembly comprising:
a) a lower manifold for receiving a liquid,
b) an upper manifold for receiving a heated version of the liquid;
c) a downcomer pipe connecting the lower and upper manifolds for providing natural convective circulation of the liquid when the boiler fires;
d) a plurality of tubes disposed between the lower and upper manifolds, a majority of the plurality of tubes including lateral tube runs having a longitudinal extent oriented substantially perpendicular to the plane of the flue gas inlet when the tube assembly is installed in the boiler, the plurality of tubes being shaped to provide a flue gas pathway that is substantially parallel with linear portions of the tube runs of the majority of the plurality of tubes, the flue gas pathway including a sinuous pathway comprising a plurality of lateral flue gas pathways that are vertically superposed with respect to one another; and,
e) a plurality of blocking members generally oriented horizontally with respect to the longitudinal axis of the lateral tube runs and being located on a portion of some of the lateral tube runs to restrict the vertical extent of the flue gas thereat, wherein, during use, when a burner fires a flue gas flame into the boiler, a flue gas flow follows the flue gas pathway and transfers heat to the liquid as the liquid travels in the plurality of tubes from the lower manifold to the upper manifold.

14. A tube assembly as claimed in claim 13, wherein the majority of the plurality of tubes in the tube assembly further comprise a C-shaped section and a sinuous section, wherein for each of the plurality of tubes the C-shaped section is connected at one end to the lower manifold, and at an opposing end to the sinuous section, wherein, collectively, the exterior of the C-shaped sections of the majority of the plurality of tubes provide both a combustion chamber for a flue gas flame and a closed end wall, disposed generally opposite to the flue gas inlet such that, in use, the flue gas flame is generally directed towards the closed end wall when the burner fires into the boiler.

15. A tube assembly as claimed in claim 13, wherein the sinuous section of the majority of the plurality of tubes comprise a plurality of lateral tube runs connected and vertically spaced apart from one another by tube bends to provide, in combination with adjacent tubes, the lateral flue gas pathways that are vertically superposed with respect to one another, and wherein end portions of the sinuous sections of the majority of adjacent tubes in the tube assembly are laterally offset with respect to one another to provide, in use, upward channels for the flue gas pathway with respect to a wall of the boiler, wherein each upward channel connects a lower lateral flue gas pathway to an upper lateral flue gas pathway, and wherein each of the blocking members are located on the end portion of some of the laterally offset sinuous sections of the adjacent tubes to restrict the vertical extent of the upward channels.

16. A tube assembly as claimed in claim 13, wherein the sinuous section of the majority of the plurality of tubes comprise a plurality of lateral tube runs connected and vertically spaced apart from one another by tube bends to provide the lateral flue gas pathways that are vertically superposed with respect to one another, and wherein the lateral tube runs in the sinuous section of the majority of adjacent tubes are vertically disposed with respect to one another to also provide, in use, vertical extending sinuous flue gas pathways.

17. A tube assembly for use in a boiler, the tube assembly comprising:
a) a lower manifold for receiving a liquid,
b) an upper manifold for receiving a heated version of the liquid;
c) a downcomer pipe connecting the lower and upper manifolds for providing natural convective circulation of the liquid when the boiler fires;
d) a plurality of tubes disposed between the lower and upper manifolds, a majority of the plurality of tubes having a lower section and an upper section shaped to provide, in combination with adjacent tubes, a lower flue gas pathway and an upper flue gas pathway, the lower section of the majority of the plurality of tubes having a shape for guiding the lower flue gas pathway in a parallel fashion with respect to substantially linear portions of the lower section of the majority of the plurality of tubes for transferring heat to the liquid as the liquid travels in the tube assembly from the lower manifold to the upper manifold when a burner associated with the boiler fires a flue gas flame and wherein the exterior of the lower section of the majority of the plurality of tubes provide a closed end wall disposed with respect to the burner such that, in use, the flue gas flame is generally directed towards the closed end wall when the burner fires; and
e) a plurality of blocking members generally oriented horizontally with respect to the longitudinal axis of lateral portions of the upper section of the plurality of tubes and located on a portion of the upper section of some of the plurality of tubes to restrict the vertical extent of the flue gas thereat.

18. A tube assembly as claimed in claim 17, wherein the upper section of the majority of the plurality of tubes in the tube assembly comprises a sinuous section connected to the lower section of the majority of the plurality of tubes and the upper manifold, and wherein the sinuous section of the majority of the plurality of tubes comprises a plurality of lateral tube runs connected and vertically spaced apart from one another by tube bends to provide, in combination with adjacent tubes, lateral flue gas pathways that are vertically superposed with respect to one another, and wherein end portions of the sinuous sections of the majority of adjacent tubes in the tube assembly are laterally offset with respect to one another to provide, in use, upward channels for the flue gas pathway with respect to walls of the boiler, each upward channel connecting a lower lateral flue gas pathway to an upper lateral flue gas pathway, and wherein each of the blocking members are located on the end portion of some of the laterally offset sinuous sections of the adjacent tubes to restrict the vertical extent of the upward channels.

19. A tube assembly as claimed in claim 17, wherein the upper section of the majority of the plurality of tubes in the tube assembly comprises a sinuous section connected to the lower section of the majority of the plurality of tubes and the upper manifold, and wherein the sinuous section of the majority of the plurality of tubes comprises a plurality of lateral tube runs connected and vertically spaced apart from one another by tube bends to provide lateral flue gas pathways that are vertically superposed with respect to one another, and wherein the lateral tube runs in the sinuous section of adjacent tubes are vertically disposed with respect to one another to also provide vertical extending sinuous flue gas pathways.

20. A tube assembly as claimed in claim 17, wherein the lower section of the majority of the plurality of tubes in the tube assembly includes a C-shaped section connected between the lower manifold and the upper section of the majority of the plurality of tubes, wherein collectively, the exterior of the C-shaped sections of the majority of the plurality of tubes provides a combustion chamber for the flue gas flame when the burner fires into the boiler that employs the tube assembly.

* * * * *